United States Patent [19]
Hwo

[11] Patent Number: 4,882,229
[45] Date of Patent: Nov. 21, 1989

[54] BLENDS OF HIGH MOLECULAR WEIGHT POLYBUTYLENE WITH LOW DENSITY POLYETHYLENE

[75] Inventor: Charles C. Hwo, Sugarland, Tex.

[73] Assignee: Shell Oil Company, Houston, Tex.

[21] Appl. No.: 187,753

[22] Filed: Apr. 29, 1988

[51] Int. Cl.$^4$ ............................................. B32B 15/08
[52] U.S. Cl. ................................... 428/461; 525/240; 428/516; 428/910
[58] Field of Search ................. 428/461, 516, 910; 525/240

[56] References Cited

U.S. PATENT DOCUMENTS

| | | | |
|---|---|---|---|
| 3,634,551 | 1/1972 | Stancell | 260/897 |
| 3,733,373 | 5/1973 | McConnell et al. | 260/897 |
| 3,817,821 | 6/1974 | Gallini | 161/165 |
| 3,879,492 | 4/1975 | Bontinick | 260/857 |
| 3,900,534 | 8/1975 | Schard | 260/897 |
| 3,972,964 | 8/1976 | Doentremont | 260/897 |
| 4,075,290 | 2/1978 | Denzel | 260/897 |
| 4,189,519 | 2/1980 | Ticknor | 428/476 |
| 4,311,807 | 1/1982 | McCullough et al. | 525/197 |
| 4,339,495 | 7/1982 | Weiner | 428/349 |
| 4,359,544 | 11/1982 | Hwo | 524/232 |
| 4,440,899 | 4/1984 | Peerlkamp | 524/528 |
| 4,489,034 | 12/1984 | Davison | 364/331.15 |
| 4,539,263 | 9/1985 | Hoh | 428/500 |
| 4,542,188 | 9/1985 | van der Heijden | 525/240 |
| 4,554,321 | 11/1985 | Hwo et al. | 525/240 |
| 4,623,581 | 11/1986 | Hert | 428/220 |
| 4,643,945 | 2/1987 | Kiang | 428/349 |
| 4,645,792 | 2/1987 | Chatterjee | 525/490 |
| 4,657,982 | 4/1987 | Breck et al. | 525/240 |
| 4,665,130 | 5/1987 | Hwo | 525/222 |
| 4,666,778 | 5/1987 | Hwo | 428/412 |
| 4,666,989 | 5/1987 | McCullough, Jr. et al. | 525/240 |
| 4,701,496 | 10/1987 | Yoshimura et al. | 525/240 |
| 4,725,505 | 2/1988 | Hwo et al. | 428/516 |

FOREIGN PATENT DOCUMENTS

| | | |
|---|---|---|
| 1570337 | 2/1965 | Fed. Rep. of Germany. |
| 1292379 | 4/1969 | Fed. Rep. of Germany. |
| 1570353 | 4/1971 | Fed. Rep. of Germany. |

Primary Examiner—Edith Buffalow

[57] ABSTRACT

It has now been found that certain properties including peel seal characteristics of wrapping films or sheets may be improved by fabricating films or sheets from blends of high molecular weight butene-1 homopolymers or copolymers, and low density polyethylene (either modified or non-modified) and wherein such films or sheets can be bonded to a substrate such as aluminum foil, by coextrusion or lamination, with or without a tie layer adhesive forming novel structures.

21 Claims, No Drawings

BLENDS OF HIGH MOLECULAR WEIGHT POLYBUTYLENE WITH LOW DENSITY POLYETHYLENE

BACKGROUND OF THE INVENTION

The present invention relates to a heat sealable wrapping or packing film which is capable of forming a peelable seal. The seal is achievable either between two films or sheets of this kind, or between one film or sheet of this kind and a substrate. Depending on which substrate is used, an additional tie layer adhesive may or may not be needed between this film or sheet and the substrate.

A peelable seal is defined to be the seal or joint between two films produced by heat sealing or impulse sealing, the joint thus formed having the property of being able to open in the original plane of joining of the two films by the action of a pulling force, without wrenching off or tearing occurring in the material of the two films used to make up the joint. For the purposes of the present invention, the peelable seal must possess a mechanical resistance sufficient to maintain the wholeness and the tight-seal properties of the packing and wrapping during storage and transport until such time as the packing or wrapping is opened by the user of the article. The mechanical resistance of the peelable seal must be low enough to permit ready manual opening of the joint, i.e., without the use of any auxiliary instrument.

In the past, many varieties of thermoplastic materials have been employed in the manufacture of films capable of forming peelable seals. See, for example, U.S. Pat. No. 4,189,519, to American Can, which discloses a blend for producing a peelable heat seal comprising (1) about 50 to 90 percent by weight of a copolymer of about 80 to 96 percent by weight ethylene and about 4 to 20 percent by weight of an ethylenically unsaturated ester, and (2) about 10 to 50 percent by weight of a crystalline isotactic polybutylene. The film of '519 discloses films using ethylenic components containing 4 to 20 percent by weight of an ethylenically unsaturated ester.

U.S. Pat. No. 3,900,534 to Mobil Oil Corporation generally discloses thermoplastic shrink films with good heat seal characteristics and good optical properties, however, '534 does not address the need for a peel seal film.

U.S. Pat. No. 3,817,821 to E. I. DuPont de Nemours & Co. discloses blends of EVA with polybutylene at 20–40 weight percent.

U.S. Pat. No. 3,879,492 to UCB S. A. Belgium discloses blends of polybutylene+styrene-butadiene copolymer+LDPE+HDPE+polyisobutylene.

U.S. Pat. No. 4,539,263 to E. I. DuPont de Nemours & Co. discloses peel seals based on blends of propylene copolymers.

U.S. Pat. Nos. 4,665,130 and 4,666,778 discloses blends of polybytylene+EVA (or polyethylene)+polypropylene with polypropylene being less than 15 weight percent in the blend.

U.S. Pat. No. 4,359,544 to Shell Oil Company describes a method for promoting crystallization of various butene-1 homopolymers and copolymers, wherein the copolymers have no more than 15 mole% ethylene, wherein the method comprises adding to a composition comprising the butene-1 homopolymers or copolymer 0.02 to 5% wt stearamide and about 0.02 to 5% wt high density polyethylene.

U.S. Pat. No. 4,440,899 to Stamicarbon describes a polyolefin composition comprising an intimate mixture of 20 to 99.5% wt of a first stabilized polyolefin powder and from about 0.5% to about 80% by weight of a second at most slightly stabilized polyolefin powder wherein the second powder has a crystalline melt point at least one degree higher than that of the first powder and the second powder has the ability to be oxidized under process conditions. Both the first and second powders are polyolefins, and in particular a polyethylene composition is disclosed throughout the examples. The polyethylene so disclosed is generally one having a density of 0.938 g/ml.

U.S. Pat. No. 4,489,034 to Shell Oil Company describes a process using crystalline polymer sheets prepared by the peroxide reacting of a mixture of a polyalphaolefin selected from polypropylene and polybutylene with a polyethylene. In particular, this patent claims a product obtained by contacting a mixture of 95 to 65% wt of a mixture of about 50 to 96% wt of crystalline isotactic polyalphaolefin selected from the group consisting of polypropylene and polybutylene and about 50 to 40% wt of a polyethylene; 5 to 35% wt of an impact modifier; and an effective amount of 1,2-polybutadiene cross-linking efficiency improver.

U.S. Pat. No. 4,657,982 to DuPont Canada Inc. describes blends and films made from 80 to 99% of a polyethylene, 0.5 to 10% of a polybutene having a number average molecular weight of from 500 to 1500 and 0.5 to 10% wt of a polybutene having a number average molecular weight of from 1700 to 10,000.

U.S. Pat. No. 3,733,373 to Eastman Kodak Company claims a blend comprising about 70 to 99.9% wt of a substantially crystallizable polymer of 1-butene selected from homopolymers of 1-butene and copolymers of 1-butene and a polymerizable dissimilar olefin of 2–12 carbon atoms with the alpha-olefin being present in the copolymer at a concentration of up to 20% wt as well as second polymer, having 0.1 to 30% wt of a polymer of ethylene selected from a homopolymer of ethylene or a copolymer of ethylene and a higher alpha-olefin with the higher alpha-olefin being present in the copolymer in a concentration of up to about 10% wt and wherein the ethylene has a density of at least 0.93.

There has been a long felt need for new compositions, film or sheets and laminar structures usable as wrapping or packaging materials, having easy peelability at the seal and yet which will bond to polypropylene without the aid of an adhesive and will bond to other substrates using a tie layer adhesive having a clean sealing surface with few angel hairs contained therein upon opening of a sealed area.

SUMMARY OF THE INVENTION

It has now been found that certain properties including film peel seal characteristics of wrapping films or sheets may be improved by fabricating films or sheets from blends of high molecular weight butene-1 homopolymer or copolymer, and low density polyethylene (either modified or non-modified), to lessen the amount of angel hair on the peel surface and provide an essentially clean peel surface. Such films or sheets can be bonded to a substrate, such as nylon or aluminum foil by coextrusion or extrusion lamination. Reference is made within this application to films, but sheets may be formed, as well. The laminated or coextruded blends can then be disposed on other substrates, such as high density polyethylene or polypropylene.

In the present invention, the blends comprise a mixture containing preferably 90 to 70 percent by weight of a modified or non-modified low density polyethylene, and 10 to 30 percent by weight of butene-1 homopolymers or copolymers. The most preferred mixture of polymers may range from about 85 percent by weight to about 75 percent by weight of the modified or non-modified low density polyethylene and from about 15 percent by weight to about 25 percent by weight of the high molecular weight butene-1 homopolymer or copolymer.

DETAILED DESCRIPTION OF THE PREFERRED EMBODIMENT

A wrappable film may be made which is capable of forming peel seals and comprises a mixture containing from about 8 percent by weight to about 49 percent by weight of butene-1 homopolymer or copolymer having an average molecular weight of at least 500,000, and from about 92 percent by weight to about 51 percent by weight of a modified or non-modified low density polyethylene having a density of less than 0.930 g/cc.

More preferably, the film comprises from about 10 percent by weight to about 30 percent by weight of the butene-1 homopolymer or copolymer, and from about 90 percent by weight to about 70 percent by weight of the modified or non-modified low density polyethylene.

Most preferably, the film comprises from about 25 percent by weight to about 15 percent by weight of the modified or non-modified low density polyethylene, and from about 75 percent by weight to about 85 percent by weight of the butene-1 homopolymer or copolymer.

The term butene-1 homopolymer or copolymer refers to a polymer containing at least 90%, preferably at least 97%, and particularly at least 98% by weight of isotactic portions. Isotactic butene-1 homopolymers or copolymers considered as usable herein have a weight average molecular weight of greater than 500,000, and preferably 750,000–1,750,000 as determined by gel permeation chromatography. Suitable butene-1 homopolymers and copolymers have a density of 0.900–0.919, preferably 0.916–0.919 and particularly 0.917–0.919 and a melt index of 0.1 to 2. Butene-1 polymers having melt indices of 0.40 and 2 are considered particularly useful herein. Melt indices are determined by ASTM D1238, Condition E.

Butene-1 homopolymers and copolymers can be obtained, for example, in accordance with Ziegler-Natta low pressure polymerization of butene-1, e.g. by polymerizing butene-1 with catalysts of $TiCl_3$ or $TiCl_3$ $AlCl_3$ and $Al(C_2H_5)_2Cl$ at temperatures of 10°–50° C., preferably 20°–40° C., e.g. according to the process of German Published Application No. 1, 570, 353 and then further processing the polymer in accordance with conventional methods, e.g., according to German published Application Nos. 1,292,379 and 1,570,337.

The butene-1 homopolymer or copolymer may be usable in combination with a small amount of stabilizer, such as Irganox 1010. Typical commercially available butene-1 homopolymers or copolymers usable herein include those available from Shell Chemical Company of Houston, Tex., and known as DP 1560, DP 1520, and DP 0110.

The low density polyethylene (LDPE) employed in the novel formulations can be characterized as having a density below about 0.930 g/cc and more preferably less than 0.920 g/cc. LDPE usable herein may have a density below 0.910 g/cc. LDPE with a melt index of from about 0.1 to 70 g/10 minutes as measured by ASTM D1238, Condition E, is typically employed. A particularly suitable LDPE for example, has a melt index of 0.5 g/10 min, and a density of 0.920 grams/cm². Examples of a LDPE usable herein include Chevron PE 1017 which has a density of 0.917 g/cm² available from Chevron Chemical Company and Chevron PE 4517 with a density of 0.923 g/cm².

A low density polyethylene with a suitable viscosity at mixing temperatures approximating that of the butene-1 homopolymer or copolymer facilitates mixing of the components. A wide variety of suitable polyethylenes are commercially available and methods for their preparation are well known in the art.

The low density polyethylene employed herein may be either a modified or non-modified polyethylene. If the low density polyethylene is modified it is typically polyethylene prepared using between about 0.1 to about 5% by weight of maelic anhydride.

If desired, various mold release agents, conventional fillers, thermo- and ultraviolet stabilizers, processing agents, slip agents, anti-block agents, pigments and/or other additives may be incorporated into the polymers before blending the polymers together or alternatively during the blending process or possibly even after the primary polymers are blended together. The effect of the various additives on certain properties of the composition may or may not make their presence desirable depending in part on the contemplated end use.

The method of combining the polybutylene and the low density polyethylene is not critical unless it effects the properties of the resultant formulation. Melt compounding or dry tumbling the blend is a preferred method for blending the components.

For commercial utility, it is desirable to use the least amount of energy to combine the components into an effective blend, i.e. a blend in which the butene-1 polymers in a masterbatch are added to low density polyethylene using an intensive mixing device such as a twin-screw extruder and incorporating the low density polyethylene into the butene-1 polymers by passing the butene-1 polymers through an extruder coupled with a side-arm extruder through which the masterbatch is added. An alternative method is to employ an extruder provided with two side-arm extruders wherein the low density polyethylene and the stabilizer or other components are injected to the first side-arm and the butene-1 polymers are injected through the second side-arm extruder. Other intensive mixing devices such as Banbury mixers may be employed to make the masterbatch. These films can be disposed onto a first substrate, such as nylon or aluminum foil through extrusion or lamination. After blending, the novel polymer compositions may be formed into an oriented or unoriented film or sheet by casting a film or using the film blowing method. A tie layer adhesive of low density polyethylene may be used in some embodiments of this invention.

After fabrication into a film or sheet on a first substrate, the film or sheet can be heat sealed to itself blend side to blend side or to a second substrate, such as high density polyethylene or polypropylene by sealing jaws at a preset temperature, pressure and dwell. The seal strength is tested by an Instron tensile tester at 10"/min. crosshead speed. Maximum strength on a one inch width strip was designated as peel seal strength.

Accordingly, besides the blend invention, the present invention may comprise a laminar structure which comprises the blend disposed on a first substrate of polyamide or aluminum foil. The laminar structure can be formed by coextrusion, wherein the blend is coextruded with the substrate. The peelable film or sheet also can be formed through lamination to the polyamide or foil forming a unique peelable article. Other materials besides polyamides and aluminum foil may be usable herein as the first substrate. Some of the materials as first substrate will most likely require the employment of a tie layer adhesive, such as a layer of low density polyethylene to bond the film or sheet to the substrate.

A laminar structure can be made by making two separate films or sheets that are then laminated together. This laminar structure may be prepared from two separate films which are prefabricated by either film blowing (melt extrusion with a circular die) or the casting method (a flat die-melt extrusion process).

Melt extrusion with a flat die (casting) may be accomplished for thermoplastic polymers by using a flat die or slot die. The extrusion process starts with a polymer in a form that can be fed continuously into an extruder by means of a screw or pneumatic tube. Sometimes the polymers are combined with materials such as plasticizers, lubricants, stabilizers and colorants by means of Banbury mixers. The resulting mix is extruded through rod shaped dies and chopped into pellets. Pelletized polymer is fed into a screw conveyer into the end of a screw-type extruder and is heated and made into viscous fluid in a cylinder by means of a revolving, helical screw. The material emitting from the die is quenched on a temperature controlled chill roll. Finished materials or sheets which may be subject to either one-way or two-way (biaxial) stretching using continuous tenter-frame operations in biaxially orientation.

The laminer structure can then be further adhered to a second substrate, such as high density polyethylene or polypropylene as mentioned hereinbefore.

EXAMPLE 1

15 weight percent Polybutylene PB0110 having a melt index of about 0.4 dg/min (ASTM method D-1238 condition "E") and a density of about 0.915 was dry blended in a tumbler mixture with 85 w% of low density polyethylene PE 4517 available from Chevron. The resultant blend was coextrusion coated onto a 30 micron thick aluminum foil, available from Reynolds Metals using USI Chemicals N.A. 211 low density polyethylene with a density of 0.924 g/cm² and a melt index of 4.5 as the tie layer adhesive. A die temperature of about 600° F. was used to dispose the film of several mils in thickness onto a 500 micron thick substrate using a flat die. The foil structure was then sealed onto a second substrate with a cup sealer. For this example, the second substrate was a high density polyethylene sheet available from Dupont Alathon 7815.

Peel strength of the resulting structure was tested. The extruded film as disposed on the second substrate was sealed together in film to film contact. The second substrate was not heated during sealing. 40 pounds per square inch of pressure and a dwell time of about 0.5 seconds were used for sealing. The resulting sealed structure was Al foil/LDPE/(LDPE+PB0110) on the second substrate with layer thicknesses of 30 micron/27 micron/46 micron, respectively for the film layers. After the film was cooled, one inch wide strips were cut from the film at locations across its width for testing of their seal strengths physical properties are given in Table 1, below.

EXAMPLE 2

Example 1 was essentially repeated using 20wt% PB0110 and 80wt% LDPE. The results appear on Table 1.

EXAMPLE 3

Example 1 was essentially repeated using 25wt% PB0110 and 75wt% LDPE. The results appear on Table 1.

EXAMPLE 4

Example 1 was essentially repeated using 15wt% PB0110 and 85wt% LDPE except the second substrate was changed to a polypropylene sheet, here Shell 5384 available from Shell Chemical Company of Houston, Tex., instead of the high density polyethylene of Examples 1-3. The results appear in Table 1.

EXAMPLE 5

Example 4 was essentially repeated using 20wt% PB0110 and 80wt% LDPE. The results appear in Table 1.

EXAMPLE 6

Example 4 was essentially repeated using 25wt% PB0110 and 75wt% LDPE. The results appear in Table 1.

TABLE 1

|  | #1 | #2 | #3 | #4 | #5 | #6 |
|---|---|---|---|---|---|---|
| Seal Coat Blend Composition on a first substrate of aluminum foil | | | | | | |
| PB0110, wt % | 15 | 20 | 25 | 15 | 20 | 25 |
| LDPE[a], wt % | 85 | 80 | 75 | 85 | 80 | 75 |
| Second Substrate[b] | HDPE | HDPE | HDPE | Polypropylene | Polypropylene | Polypropylene |
| Seal Strength, lb/in[c] | | | | | | |
| At 360° F. (182° C.) | 2.95 | 2.85 | 2.35 | — | — | — |
| 380° F. (193° C.) | 7.02 | 6.19 | 2.80 | — | — | — |
| 400° F. (204° C.) | 8.07 | 7.77 | 4.23 | 3.16 | 4.02 | 4.21 |
| 420° F. (216° C.) | 8.82 | 7.85 | 4.71 | 3.06 | 4.06 | 4.45 |
| 440° F. (227° C.) | 10.03 | 8.36 | 4.95 | 3.44 | 4.27 | 4.69 |
| 460° F. (238° C.) | — | — | — | 4.36 | 4.89 | 4.59 |

[a] Low Density PE: 4.5 MI
[b] Second Substrate Thickness: 500 Microns
[c] As tested by an Instron Tensil Tester, ASTMD-882.

What is claimed is:

1. A composition which is capable of forming peel seals, comprising:

from about 8 percent by weight to about 49 percent by weight of the butene-1 homopolymer or copolymer having an average molecular weight of at least 500,000; and from about 92 percent by weight to about 51 percent by weight of a modified or non-modified low density polyethylene having a density of less than 0.930 g/cc.

2. The composition of claim 1 which consists of:

from about 10 percent by weight to about 30 percent by weight of said butene-1 homopolymer or copolymer; and from about 90 percent by weight to about 70 percent by weight of said modified or non-modified low density polyethylene.

3. The composition of claim 1 which consists of:

from about 15 percent by weight to about 25 percent by weight of said modified or non-modified low density polyethylene; and from about 75 percent by weight to about 85 percent by weight of said butene-1 homopolymer or copolymer.

4. The composition of claim 1, wherein said modified low density polyethylene has been functionalized with maelic anhydride.

5. A film or sheet which is capable of forming peel seals, comprising:

from about 8 percent by weight to about 49 percent by weight of a modified or non-modified low density polyethylene having a density of less than 0.930 g/cc; and from about 92 percent by weight to about 51 percent by weight of a butene-1 homopolymer or copolymer having an average molecular weight of at least 500,000.

6. The film or sheet of claim 5 which consists of:

from about 10 percent by weight to about 30 percent by weight of said modified or non-modified low density polyethylene, and from about 90 percent by weight to about 70 percent by weight of said butene-1 homopolymer or copolymer.

7. The film or sheet of claim 5 which consists of:

from about 25 percent by weight to about 15 percent by weight of said modified or non-modified low density polyethylene;

from about 75 percent by weight to about 85 percent by weight of said butene-1 homopolymer or copolymer.

8. The film or sheet of claim 5, wherein said modified low density polyethylene has been functionalized with maelic anhydride.

9. The film or sheet of claim 5 which comprises a biaxially oriented film or sheet.

10. The film or sheet of claim 5 which has been further disposed on a first substrate.

11. The film or sheet of claim 10, wherein the first substrate is a member of the group aluminum foil or polyamide.

12. The film or sheet of claim 11, wherein the polyamide is nylon.

13. A laminar structure comprising a first substrate to which a film or sheet is bonded by extrusion lamination or coextrusion forming a structure capable of forming peel seals, wherein said film or sheet comprises:

from about 10 percent by weight to about 49 percent by weight of butene-1 homopolymer or copolymer having an average molecular weight of at least 500,000;

from about 90 percent by weight to about 51 percent by weight of a modified or non-modified low density polyethylene having a density of less than 0.930 g/cc.

14. The laminar structure of claim 13 wherein said film or sheet consists of:

from about 10 percent by weight to about 30 percent by weight of said butene-1 homopolymer or copolymer; and from about 90 percent by weight to about 70 percent by weight of said modified or non-modified low density polyethylene.

15. The laminar structure of claim 13 wherein said film or sheet consists of:

from about 25 percent by weight to about 15 percent by weight of said modified or non-modified low density polyethylene; and from about 75 percent by weight to about 85 percent by weight of said butene-1 homopolymer or copolymer.

16. The laminar structure of claim 13, wherein the first substrate is aluminum foil.

17. The laminar structure of claim 13, wherein the first substrate is aluminum foil and an additional tie layer adhesive is disposed between said film or sheet and said substrate.

18. The laminar structure of claim 17, wherein the tie layer adhesive is modified low density polyethylene.

19. The laminar structure in claim 13, wherein said film or sheet is unoriented or oriented.

20. The laminar structure of claim 13, further disposed on a second substrate.

21. The laminar structure of claim 20, wherein the second substrate is a member of the group; high density polyethylene, and polypropylene.

* * * * *